United States Patent
Fuchs et al.

(10) Patent No.: US 6,840,563 B2
(45) Date of Patent: Jan. 11, 2005

(54) PLATE IN A MOTOR VEHICLE WITH A METALLIC SUPPORT STRUCTURE

(75) Inventors: Corinna Fuchs, Ludwigsburg (DE); Michael Koch, Sindelfingen (DE)

(73) Assignee: CTS Farhrzeug-Dachsystems GmbH, Hamburg (DE)

(*) Notice: Subject to any disclaimer, the term of this patent is extended or adjusted under 35 U.S.C. 154(b) by 0 days.

(21) Appl. No.: 10/456,626

(22) Filed: Jun. 9, 2003

(65) Prior Publication Data

US 2003/0209920 A1 Nov. 13, 2003

Related U.S. Application Data

(63) Continuation-in-part of application No. PCT/EP02/08081, filed on Jul. 19, 2002.

(30) Foreign Application Priority Data

Jul. 24, 2001 (DE) ........................................ 101 35 223

(51) Int. Cl.[7] ................................................. B60J 7/00
(52) U.S. Cl. ................................................ 296/107.08
(58) Field of Search ....................... 296/107.08, 107.01; 343/711, 712, 713

(56) References Cited

U.S. PATENT DOCUMENTS

| | | | | |
|---|---|---|---|---|
| 2,859,441 A | * | 11/1958 | Rosenbaum | 343/712 |
| 3,611,388 A | * | 10/1971 | Okumura | 343/712 |
| 4,109,251 A | * | 8/1978 | MacDougall | 343/715 |
| 4,758,166 A | * | 7/1988 | Bonnett et al. | 343/712 |
| 4,760,394 A | * | 7/1988 | Takeuchi et al. | 340/10.42 |
| 4,821,042 A | * | 4/1989 | Ohe et al. | 343/712 |
| 4,866,453 A | * | 9/1989 | Nagy et al. | 343/713 |
| 5,402,134 A | * | 3/1995 | Miller et al. | 343/713 |
| 6,236,373 B1 | * | 5/2001 | Park | 343/713 |
| 6,351,242 B1 | * | 2/2002 | Hesker | 343/713 |
| 6,377,221 B1 | * | 4/2002 | Lindenmeier et al. | 343/712 |
| 6,454,343 B1 | * | 9/2002 | Wagner et al. | 296/107.08 |
| 6,661,385 B2 | * | 12/2003 | Zinsmeister et al. | 343/713 |

FOREIGN PATENT DOCUMENTS

| | | | | |
|---|---|---|---|---|
| DE | 44 03 643 A | | 8/1995 | |
| DE | 44 46 483 A | | 6/1996 | |
| DE | 199 28 213 A | | 5/2001 | |
| DE | 100 25 130 A | | 11/2001 | |
| FR | 2565417 | * | 12/1985 | ......... 343/700 MS |
| JP | 5-167327 | * | 7/1993 | |
| JP | 10-329615 | * | 12/1998 | |

* cited by examiner

Primary Examiner—D. Glenn Dayoan
Assistant Examiner—H. Gutman
(74) Attorney, Agent, or Firm—Klaus J. Bach

(57) ABSTRACT

In a cover plate arrangement in a motor vehicle including a cover plate comprising at least a section with a metallic support plate structure which section is coupled to a component of the motor vehicle so as to be movable relative thereto the metallic support structure is electrically insulated with respect to any adjacent components of the motor vehicle for use as an antenna.

12 Claims, 3 Drawing Sheets

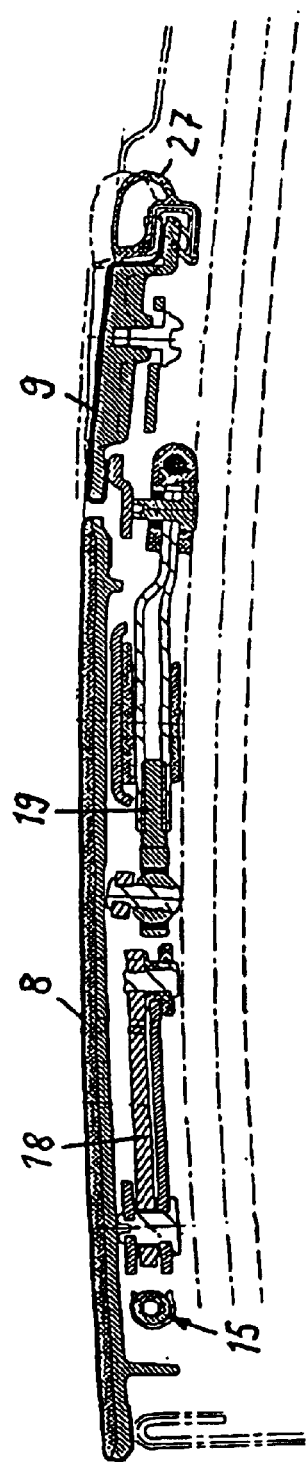
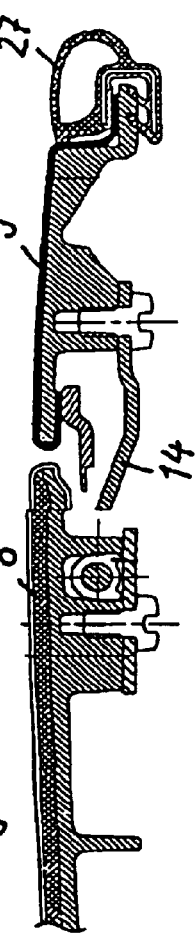
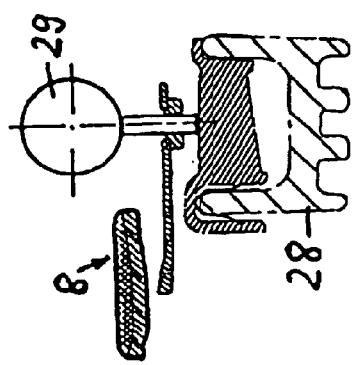
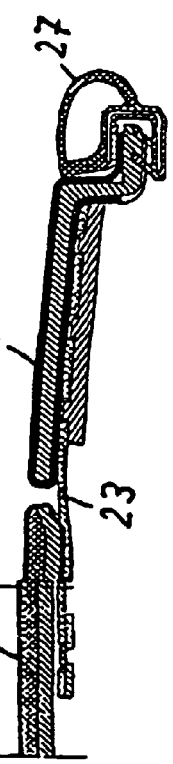
Fig. 3
Fig. 4
Fig. 5
Fig. 6

PLATE IN A MOTOR VEHICLE WITH A METALLIC SUPPORT STRUCTURE

This is a Continuation-In-Part application of international application PCT/EP02/08081 filed Jul. 19, 2002 and claiming the priority of German application 101 35 223.9 filed Jul. 24, 2001.

BACKGROUND OF THE INVENTION

The invention relates to a plate in a motor vehicle with an at least partially metallic support structure which plate is connected to another part of the motor vehicle so as to be movable relative thereto.

DE 44 46 483 A1 discloses a cover for a storage compartment for a removable vehicle roof which is movable between a closed position, in which it extends over the interior space of a vehicle, and an open position, in which it is removed from the vehicle passenger space and contained in the storage compartment behind the interior vehicle space. The cover storage compartment is closed by a compartment cover, which, at the same time, forms the trunk lid. For opening the compartment cover, it is supported on the vehicle so as to be pivotable about a pivot axis at the rear end of the vehicle.

In an area between the vehicle top storage compartment and the vehicle seats, a movable cover is arranged which consists of three joined foldable parts and which is movable between a horizontal cover position and a folded opening position. The cover is provided with side cover parts which are pivotable relative to the central cover part and which when pivoted back, provide on the side a space for accommodating the C columns of the movable vehicle roof when it is in the closed position. When the vehicle roof is open, this space is closed by a side cover part, so that the cover forms a flat uniform support surface. The cover is moved between the cover and the folded position by means of a separate operating member.

The cover comprising several parts can be used in its stretched out position as a support surface, that is a utility shelf, accessible from the vehicle interior when the vehicle cover is closed. Other uses for this cover are not known.

DE 199 28 213 C1 discloses a slot antenna for motor vehicles which comprises an electrically conductive metal band which extends around a support member of a dielectric plastic material. In accordance with an embodiment described in this publication, the antenna is arranged in the center of a shelf structure (hat shelf) behind a rear vehicle seat. The hat shelf and the antenna are separate components that is, the antenna is not integrated into the hat shelf; it merely supports the antenna. This requires assembly expenses and, furthermore, has additional disadvantages.

It is the object of the present invention to advantageously utilize a plate, which is part of a motor vehicle also in ways beyond its original design purposes. The plate should furthermore be as stable as possible.

SUMMARY OF THE INVENTION

In a cover plate arrangement in a motor vehicle including a cover plate comprising at least a section with a metallic support plate structure which section is coupled to a component of the motor vehicle so as to be movable relative thereto the metallic support structure is electrically insulated with respect to any adjacent components of the motor vehicle for use as an antenna.

With the plate being electrically insulated relative to all adjacent parts, the plate itself can be used as an antenna for the reception of electromagnetic radiation which is to be supplied to a vehicle radio. Since the plate is insulated with respect to the adjacent components, particularly with respect to the operating mechanism or components thereof, such as its joints, disturbances of the antenna functions are avoided. The plate is particularly suitable for the reception of electromagnetic waves in the medium-frequency range.

The reinforcement with the metallic support structure further has the advantage of providing a relatively sturdy structure of relatively low weight. Particularly with a support structure made by magnesium injection molding the advantages of high stability, low weight and optimal radio frequency reception can be combined.

If the metallic support structure extends only over part of the plate, the metallic support structure can be electrically insulated within the plate by sections of the plate which consist of an electrically non-conductive material. However, it is also possible to provide for insulation around the outer edges of the plate independently of whether or not the sections between the support structure and the outer edges of the plate are electrically conductive or not.

The plate is expediently connected directly, but possibly also indirectly, to the vehicle body. The plate may be, for example a lid covering an opening in the vehicle body, such as a vehicle top storage compartment or a trunk lid, a sliding roof or the roof shell of a hardtop. In these cases, the plate forms a part of the outer surface structure of the vehicle. Furthermore, the plate may be a storage shelf disposed behind the rear seat back rest, which is disposed in the vehicle interior adjacent the rear view window where the shelf is exposed to electromagnetic waves essentially without restriction. If the vehicle roof is removable, the rear storage shelf is anyway disposed outside when the vehicle roof is opened.

The storage shelf, which is disposed in the open space between the front edge of the vehicle top storage compartment cover and the divider wall between the vehicle interior and the vehicle top storage compartment, then forms a cover member which is movable between a cover position, in which the cover member is arranged essentially horizontally when the vehicle top is in its end positions, that is, in the closed position covering the interior vehicle space or in its open position, in which the vehicle top is deposited in the top storage compartment, and an open position in which the storage compartment, is opened to provide sufficient space for the transfer of the vehicle top between its closed and open positions. The cover member includes a metallic support structure, which preferably consists of magnesium made expediently by injection molding. The metallic support structure is electrically insulated with respect to an operating drive for moving the cover member, also with respect to joints by way of which the cover member is connected to other vehicle components or, respectively, the vehicle top. Because of the insulation of the cover member with respect to the operating device and with respect to the joints or hinges by way of which the cover member is pivotally supported on a vehicle component, disturbances of the antenna functions are avoided. The cover member is particularly suitable for the reception of electromagnetic waves in the intermediate frequency range.

In an advantageous embodiment, the cover member is a two-part member with a front and a rear cover part wherein the rear cover part is hinged to the front cover part which itself is pivotally connected to a vehicle component. The operating device for actuating the rear cover part extends over the front cover part and is electrically insulated with respect thereto in order to avoid grounding of the cover to the vehicle body by way of the operating device. The operating device is particularly in the form of a kinematic guide mechanism which cooperates with the movement of the vehicle top in such a way that the rear cover element can be moved, without additional drive means, into a position in which the rear vehicle top storage compartment is fully open to permit removal of the vehicle top from, or its insertion into, the vehicle top storage compartment. Preferably, in this arrangement, only the front cover part, which is disposed adjacent the vehicle interior, is electrically insulated with respect to the other vehicle components and also with respect to the rear cover part. Then only the front cover part is used as an antenna. In this way, electrical insulation of the front cover part with respect to the vehicle top storage compartment cover is facilitated.

The insulation between the front and rear cover parts can be achieved by a hinge structure, which consists of a plastic material. The hinge structure may also form a shield, which covers the gap between the front and rear cover parts in an optically pleasing fashion. Also, in the side areas of the cover member, gap shields of electrically insulating material may be attached to the cover member such that, in the closed position of the cover member, the gap shields cover the gaps between the cover member and the adjacent vehicle components. The shields consist preferably of a flexible material, for example of rubber, so that the shields can accommodate varying gap sizes, particularly during relative movement between the front and the rear cover member parts.

For the transmission of the electromagnetic radiation signals from the cover member to an electronic signal processing unit, a transmission cable is connected to the metallic support structure of the cover member, which cable is expediently connected to, and guided by, the operating mechanism by way of which particularly the rear cover member part is to be moved. The operating device can be in the form of a Bowden cable, to which the signal transmission cable is attached, but which is electrically insulated with respect to the Bowden cable.

The metallic support structure may be in the form of a plate, which provides for high stability, but it may be also be in the form of a lattice structure. A reinforcement may be provided also by a non-metallic part for example of a plastic material.

The invention will become more readily apparent from the following description of a preferred embodiment thereof, show, by way example only, in the accompanying drawings.

BRIEF DESCRIPTION OF THE DRAWINGS

FIG. 3 is a cross-sectional view taken along line III—III of FIG. 2, FIG. 4 is a cross-sectional view taken along line IV—IV of FIG. 2, FIG. 5 is a cross-sectional view taken along line V—V of FIG. 2, and FIG. 6 is a cross-sectional view taken along line VI—VI of FIG. 2.

DESCRIPTION OF A PREFERRED EMBODIMENT

Figure 1:
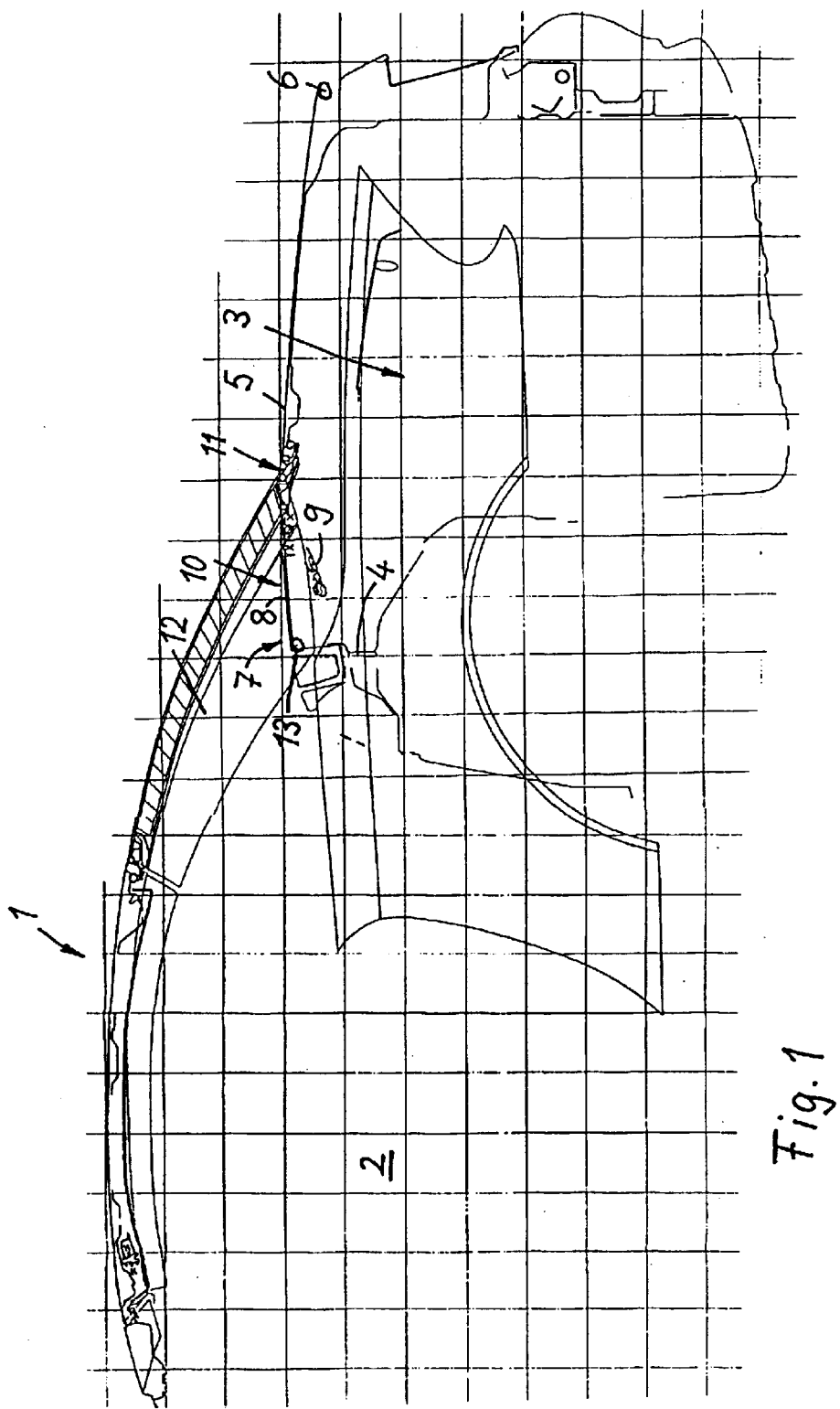
FIG. 1 is a side view of a removable vehicle roof in a closed position, including a rear vehicle top storage compartment for receiving the top of a convertible vehicle in an open position of the vehicle top, wherein the vehicle trunk lid and a two-part cover member serving as a storage shelf are shown.
Figure 2:
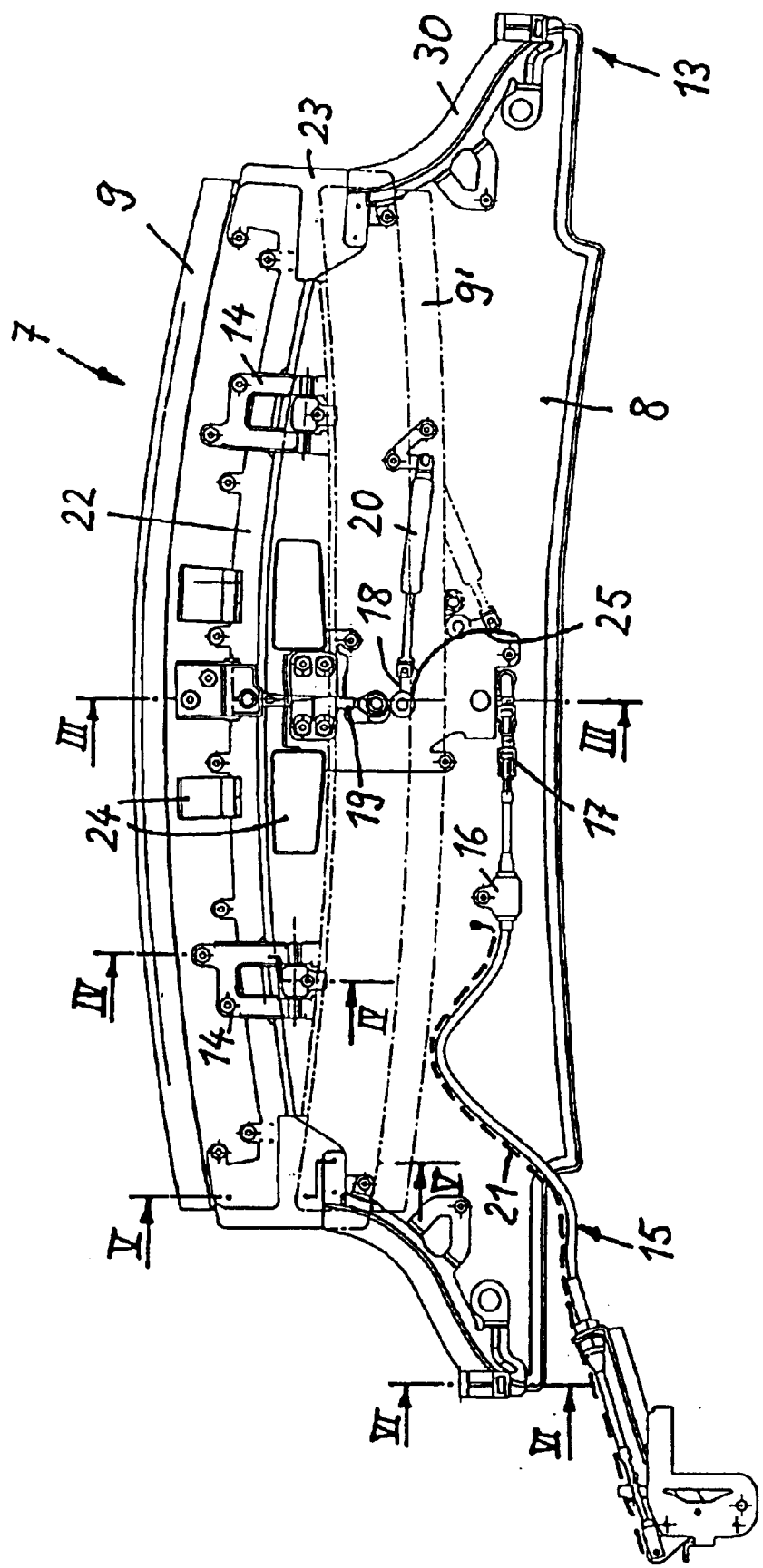
FIG. 2 is a bottom view of the two-part cover member.

The removable vehicle top 1 of a convertible motor vehicle as shown in FIG. 1 is movable between the shown closed position, in which the vehicle interior 2 is covered and an open position, in which the vehicle top 1 is lowered into a rear storage compartment 3. The removable vehicle top as shown in FIG. 1 is a hardtop comprising two or possibly three interconnected rigid roof parts which, in the open or storage position, are disposed on top of one another in the storage compartment 3. Alternatively, the vehicle top 1 may be a soft top with a top support linkage on which a cover material is supported.

The storage compartment 3 is located in the rear of the vehicle just behind the vehicle interior 2, which is separated from the rear of the vehicle by a divider wall 4. The top storage compartment 3 is provided with a storage compartment cover 5, which, at the same time, forms a trunk lid and which is supported so as to be pivotable about a rear pivot axis 6 between the closed position as shown in FIG. 1 and an open position, in which the storage compartment 3 is accessible. The compartment cover or trunk lid 5 may also be pivotable about a second pivot axis which is disposed adjacent the vehicle interior so that the trunk is accessible from the rear of the vehicle.

Furthermore, a cover plate 7 is movably disposed in the space 10 between the front edge of the top compartment cover 5 and the interior vehicle space 2, particularly the divider wall 4, which cover plate serves as a support shelf when the vehicle top is closed. The cover plate 7 comprises two parts: a front cover part 8 adjacent the vehicle interior and a rear cover part 9, which is pivotally connected to the front cover part 8. In the closed position of the vehicle top as shown in FIG. 1, the rear cover part 9 is pivoted into a position below the front cover part 8, whereby a passage 11 in the space 10 remains open through which the main arm 12 can extend which arm is part of the vehicle top operating mechanism. The passage 11 is disposed between the front edge of the top storage compartment cover 5 and the front cover part 8. The front cover part 8 is expediently pivotally connected to a top part, particularly to the main arm 12 and can be transferred from the horizontal covering position as shown to an upwardly pivoted opening position, in order to enlarge the passage 11 for the transfer of the vehicle top between the closed and the open positions. The joint by which the front cover part 8 is pivotally connected to a vehicle or, respectively, top part is indicated by the reference numeral 13 and is disposed at the front end of the front cover part 8 adjacent the vehicle interior.

Below reference is made to FIGS. 2 to 5. The rear cover part 9 is connected to the front cover part 8 by two hinges 14 so as to be pivotable about a transverse axis extending transverse to the longitudinal vehicle axis. It can be pivoted out of the extended cover position shown in FIG. 2 in full lines to the release position shown in FIG. 2 in dash-dotted lines. In this release position, the rear cover part—indicated in this position by the reference numeral 9'—is disposed below the front cover part 8 and additional opening space is provided for the transfer of the vehicle top to, and from, the top storage compartment.

For the movement of the rear cover part 9 between its extended position, in which the front cover part 8 and the rear cover part 9 are disposed in a common about horizontally extending plane and its folded position providing for the additional passage space, a drive 15 is provided which, in the embodiment shown, includes a push-pull Bowden cable, which is operated by the top operating mechanism in order to achieve a firm control of the relative movement of the rear cover part 9 with respect to the front cover part 8 in dependence on the vehicle top position. The push-pull Bowden cable drive 15 is mounted to the front cover part 8 by retaining means 16 and 17. An operating movement of the push-pull cable of the drive 16 is converted by a shift lever 18 and a coupling rod 19 into a pivot movement of the rear cover part 9 relative to the front cover part 8. By a spring element 20, which may be a gas pressure spring, the rear cover part 9 and its operating mechanism is biased into the extended position of the rear cover part 9.

The front cover part 8 consists of a metal part, particularly an injection molded magnesium part and is electrically insulated with respect to all adjacent components, particularly with respect to the rear cover part 9 and the vehicle top parts, by which the front cover part 8 is supported. The metallic structure and its electrical insulation with respect to the adjacent parts make it possible to use the front cover part 8 as an antenna for the cars radio. The electromagnetic radiation received by the cover part 8 is transmitted from the cover part 8 to the car radio by a transmission cable 21. The transmission cable 21 is expediently connected to the push-pull Bowden cable of the drive 15, but is electrically insulated relative thereto. Also, the mounting structures 16, 17 by way of which the push-pull cable is connected to the front cover part 8 are electrically insulated as are the pivot hinges 14 between the front and rear cover parts 8 and 9. They include electrically insulating sleeves, in which the respective pivot shafts of the hinges are supported. The same is true for the hinges 13, which are indicated only schematically and by which the front cover part 8 is pivotally supported on a vehicle body or, respectively, the top part thereof.

Between the front and rear cover parts 8 and 9, there is a plastic shield 22, which closes the gap between the front and rear cover parts 8 and 9 so that a continuous uninterrupted shelf surface is formed. The shield 22 extends up to the side areas of the rear cover part 9. The shield 22 also has an electric insulation function. In the transition area between the front and rear cover parts 8 and 9, the end portions of the front and rear cover parts 8 and 9 are provided with cover members 23, which consist of a flexible electrically insulating material, particularly of rubber. The cover members 23 bridge the gap between the front and rear cover parts at the opposite ends of the cover members 8 and 9 and also the gap between the rear cover part 9 and the adjacent vehicle body components. Furthermore, side shields 30 are arranged at the opposite side edges of the cover part 8 for bridging the gaps between the front cover part 8 and the adjacent vehicle body components.

Adjacent the longitudinal center axis two bumpers 24 are disposed at the bottom side of each of the front cover part 8 and the rear cover part 9, which abut the vehicle top disposed in the storage compartment when the cover parts 8 and 9 are exposed to an excessive load (for example, a person sitting on the cover parts when the vehicle top is removed). The bumpers 24 also consists expediently of an electrically insulating material.

The operating mechanism for the transfer of the movement of the cable drive 15 to the rear cover part 9 is provided with a guide track member 25, which is supported on the underside of the front cover part 8 and has a partial circular shape. By the guide track of the guide track member 25, the shift lever 18 of the operating mechanism is guided. The guide track member 25 preferably consists of plastic material in order to provide for relatively low friction during movement of the shift lever 18 along the partially circular track 25 for the movement of the rear cover part 9 between the inwardly pivoted and the extended positions thereof. The guide track of the guide track member 25 may also be in the form of a guide groove.

As apparent from FIGS. 3 to 5, a seal element 27 is provided at the rear edge of the rear cover part 9 adjacent the storage compartment cover 5, which seal element extends over the full width of the rear cover part 9 and which closes the gap between the rear cover part 9 and the storage compartment cover 5.

FIG. 6 shows a retaining screw 29 engaging a strip 28 of the front cover part 8 for facilitating assembly. The retaining screw 29 has a ball head which is inserted into a recess of a vehicle part such that automatically the cover parts automatically assume their proper positions in the longitudinal direction of the vehicle in which the front cover part can be firmly mounted to the vehicle body or component.

What is claimed is:

1. A cover plate arrangement in a motor vehicle, comprising a cover plate including at least a section with a metallic support plate structure and being coupled to a an adjacent component of the motor vehicle so as to be movable relative thereto, said metallic support plate structure being electrically insulated with respect to the adjacent component and a drive connected to said metallic support plate structure, said drive being electrically insulated from said metallic support plate structure.

2. A cover plate arrangement according to claim 1, wherein said metallic support plate structure is coupled to the adjacent component by a joint which is part of said drive.

3. A cover plate arrangement according to claim 1, wherein said cover plate arrangement is a vehicle top storage compartment cover, which is movable between a closed position, in which the compartment cover closes a vehicle top storage compartment and an open position, in which access is provided to the top storage compartment for the transfer of a vehicle top into, and out of, the top storage compartment.

4. A cover plate arrangement according to claim 3, wherein a free space between a front edge of the vehicle top storage compartment cover and a vehicle interior is covered by the cover plate which is pivotally supported on a vehicle body part, and at least said section of said cover plate is movable relative to said vehicle body part.

5. A cover plate arrangement according to claim 4, wherein said cover plate includes a front cover part adjacent the vehicle interior, and a rear cover part adjacent the vehicle top storage compartment cover, said rear cover part being pivotally connected to the front cover part by hinges.

6. A cover plate arrangement according to claim 5, wherein said drive mechanism is connected to the front cover part so as to be capable of pivoting said rear cover part relative to said front cover part.

7. A cover plate arrangement according to claim 5, wherein said front cover part is electrically insulated with respect to said rear cover part.

8. A cover plate arrangement according to claim 5, wherein a plastic material shield is disposed between the front and rear cover parts for covering any gap therebetween.

9. A cover plate arrangement according to claim 5, wherein said front cover part includes the metallic support structure and a signal transmission cable is connected to said metallic support structure and along said drive mechanism in electrically insulated relationship therewith.

10. A cover plate arrangement according to claim 5, wherein said drive mechanism comprises a push-pull Bowden cable which is supported on said cover plate by a plastic retaining means.

11. A cover plate arrangement according to claim 5, wherein said cover plate is provided a the sides thereof with a flexible electrically insulating cover member.

12. A cover plate arrangement according to claim 9, wherein said metallic support structure comprises an injection molded magnesium part.

* * * * *